(12) United States Patent
Taylor et al.

(10) Patent No.: US 6,250,691 B1
(45) Date of Patent: Jun. 26, 2001

(54) TUBE/CASTING CONNECTOR ASSEMBLY

(75) Inventors: Ken W. Taylor, Oak Ridge, NC (US); Jerker Delsing, Lulea (SE)

(73) Assignee: Dresser Equipment Group, Inc., Carrollton, TX (US)

( * ) Notice: Subject to any disclaimer, the term of this patent is extended or adjusted under 35 U.S.C. 154(b) by 0 days.

(21) Appl. No.: 09/303,015

(22) Filed: Apr. 30, 1999

(51) Int. Cl.[7] ..................................................... F16L 55/00
(52) U.S. Cl. ............................................. 285/305; 285/321
(58) Field of Search ........................................ 285/331, 305

(56) References Cited

U.S. PATENT DOCUMENTS

| 245,263 | 8/1881 | Robb . | |
|---|---|---|---|
| 2,015,786 | * 10/1935 | Carcano | 285/331 |
| 2,090,266 | * 8/1937 | Parker | 285/331 |
| 2,652,268 | * 9/1953 | Goode | 285/331 |
| 3,181,897 | * 5/1965 | Krayenbuhl et al. | 285/331 |
| 3,933,378 | * 1/1976 | Sandford et al. | 285/331 |
| 4,146,254 | * 3/1979 | Turner et al. | 285/331 |
| 4,423,891 | * 1/1984 | Menges | 285/331 |
| 4,431,218 | 2/1984 | Paul, Jr. et al. | 285/305 |
| 4,477,109 | * 10/1984 | Kleuver | 285/331 |
| 4,854,615 | * 8/1989 | Smith, III | 285/331 |
| 5,211,427 | 5/1993 | Washizu | 285/23 |
| 5,267,757 | * 12/1993 | Dal Palu | 285/331 |

FOREIGN PATENT DOCUMENTS

| 211708 | * 12/1940 | (CH) | 285/331 |
|---|---|---|---|
| 483 591 | 2/1970 | (CH) . | |
| 940 025 | 3/1956 | (DE) . | |
| 203 612 | 10/1983 | (DE) . | |
| 781 227 | 5/1935 | (FR) . | |
| 1 289 274 | 2/1962 | (FR) . | |

* cited by examiner

Primary Examiner—Eric K. Nicholson
(74) Attorney, Agent, or Firm—Haynes and Boone, LLP

(57) ABSTRACT

A tube/casting assembly and method according to which an axially-projecting cylindrical flange projects from one end of a tubular casting over which an end portion of the conduit extends. A groove is formed in the casting for receiving the end portion and a retainer secures the end portion of the conduit in the groove.

18 Claims, 4 Drawing Sheets

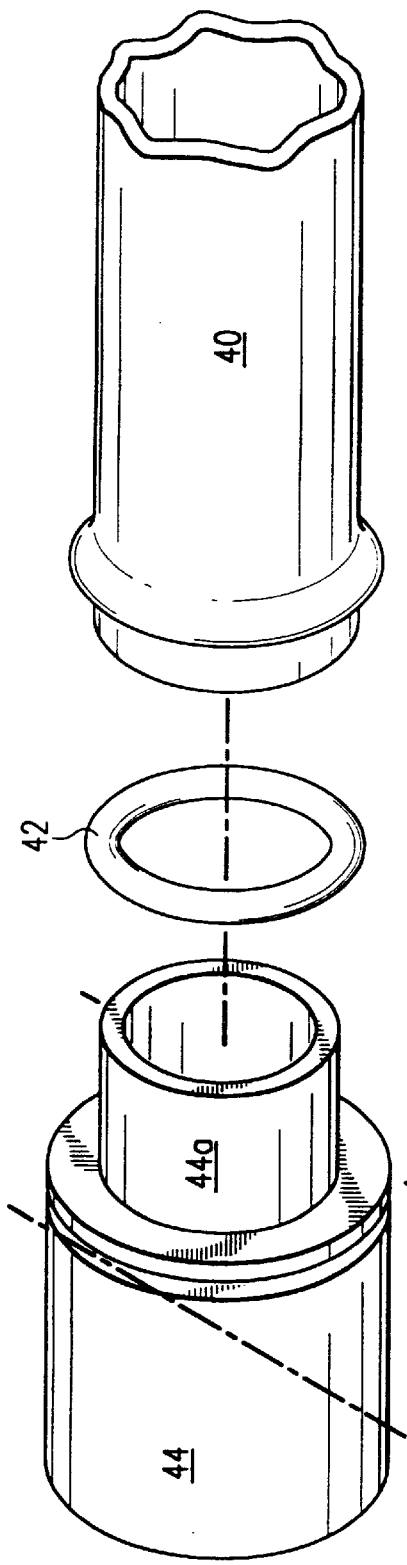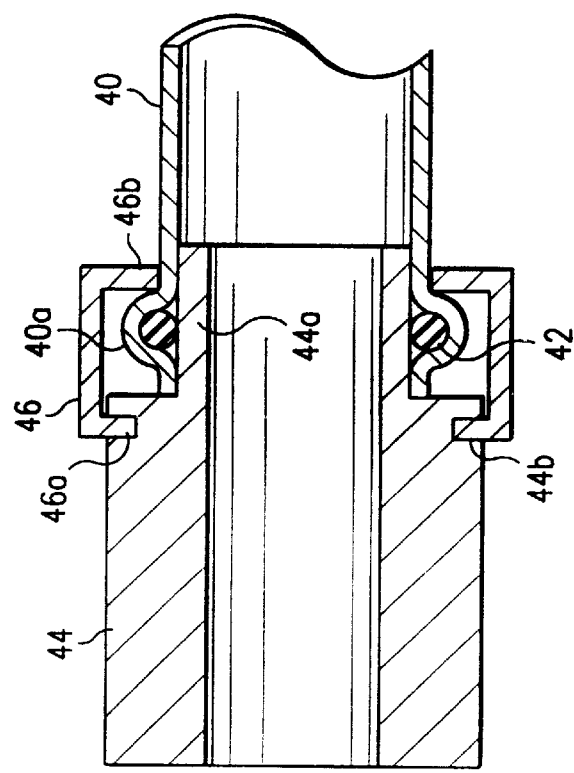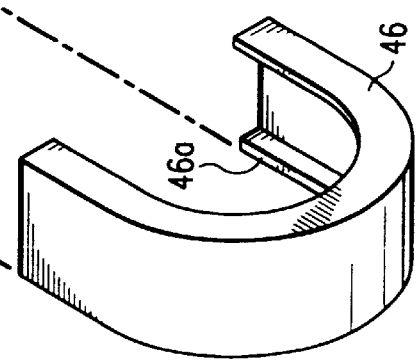

TUBE/CASTING CONNECTOR ASSEMBLY

BACKGROUND

The present invention relates to a connector assembly and method for connecting an end portion of a conduit to a relatively small casting, a fitting, or the like; and, more particularly, to such an assembly and method in which inexpensive components can be used, and welded or threaded fasteners are eliminated.

Many techniques are known for connecting an end portion of a conduit to a casting, a fitting or the like. One technique involves welding or soldering collars onto or into the conduit end and the casting, and clamping a flat packing between the collars by means of bolts which must be forcefully tightened so as to achieve a satisfactory seal. In another technique, conical sockets are welded/soldered to the conduit end and a corresponding end of the casting, and the sockets are joined by means of corresponding conical couplings. The couplings are interconnected by means of bolts that are screwed through flanges, and sealing is effected by seal rings arranged in grooves in the sockets.

The above prior art techniques require a large number of expensive materials, such as copper, brass or steel, and are also labor intensive. As a result, some techniques utilize less expensive material for the conduit, such as aluminum, and provide the conduit and the casting with protruding ends and coupling components which are die-cast and formed with threads. However, these components must be precision machined since relatively small tolerances are required for obtaining a satisfactory seal. Also, the machining operation involves a risk that the die-cast material contains pores, thereby causing leakage. Further, these techniques often take up internal space in the conduit or casting, thus reducing the effective inner flow area of the conduit. Finally, the connectors are relatively rigid and are prone to leakage due to vibration or shock.

Therefore what is needed is a connector assembly and method for connecting a conduit to a casting, a fitting, or the like, in which inexpensive components can be used, and welded or threaded fasteners are eliminated. Also needed is an connector assembly and method of the above type according to which there is no leakage and no reduction of the inner cross-section of the conduit.

SUMMARY

Accordingly to an embodiment of the present invention an axially-projecting cylindrical flange projects from one end of a tubular casting over which an end portion of a conduit extends. A groove is formed in the casting for receiving the end of the conduit, and a retainer secures the end portion of the conduit in the groove.

The connector assembly and method of the present invention enables a conduit to be connected in fluid flow communication with a casting or fitting utilizing relatively inexpensive components and without the need for welding or threaded fasteners. Also, there is no leakage and no reduction of the inner cross-section of the conduit. Further, the flexible nature of the joint and the seal is very resistant to vibration and shock.

BRIEF DESCRIPTION OF THE DRAWINGS

FIG. 5 is an exploded isometric view of another alternative embodiment of the assembly of the present invention.

FIG. 6 is a cross-sectional view of the assembly of FIG. 5 in an assembled condition.

DESCRIPTION OF THE PREFERRED EMBODIMENTS

Figure 1:
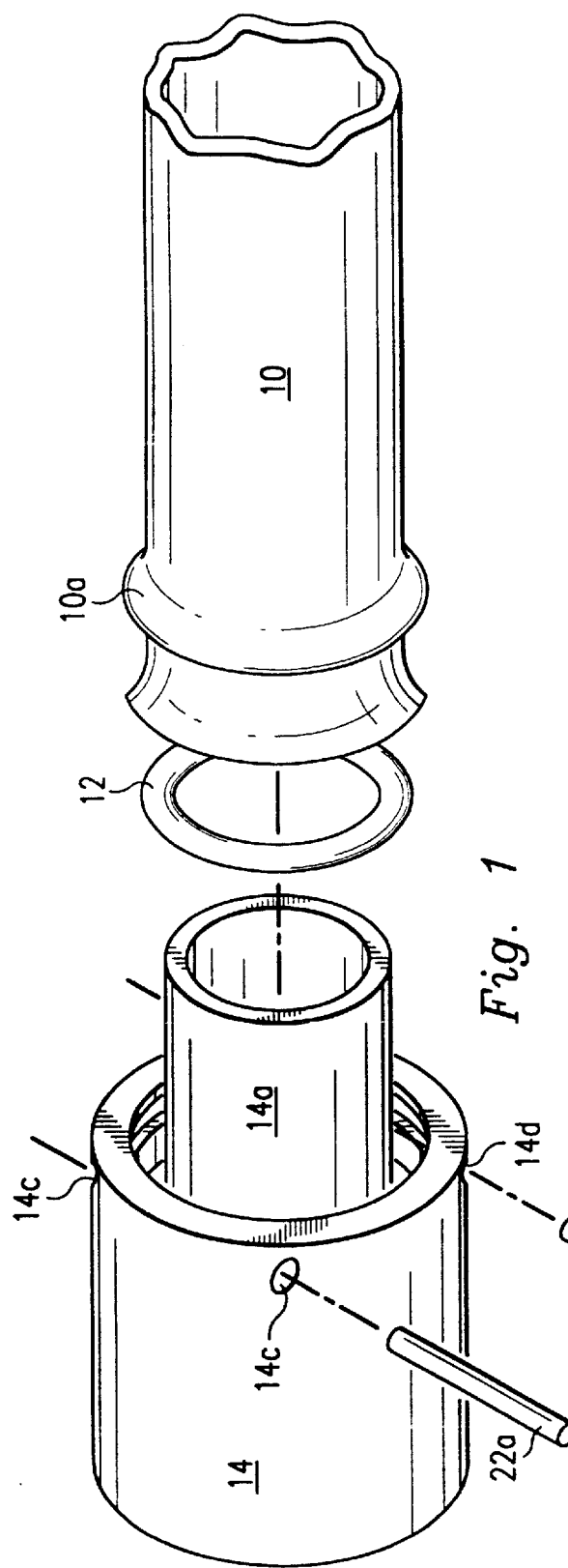
FIG. 1 is an exploded isometric view of one embodiment of the assembly of the present invention.
Figure 2:
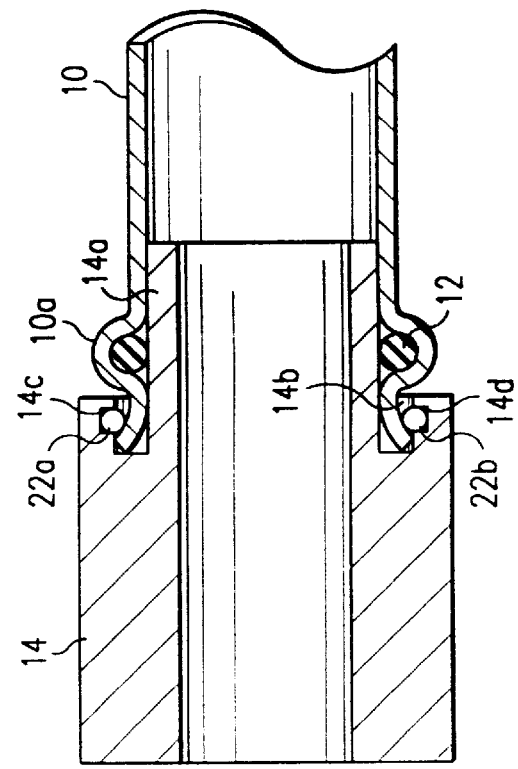
FIG. 2 is a cross-sectional view of the assembly of FIG. 1 in an assembled condition.

Referring to FIGS. 1 and 2 of the drawings, the reference numeral 10 refers to a conduit which is adapted to carry any type of fluid in a fluid distribution system, or the like. The conduit 10 is provided with an external annular bead 10a (FIG. 2) on one end portion thereof and the latter end portion is flared radially outwardly. The bead 10a is formed integrally with the conduit 10 in any known manner, such as by using an appropriate forming die, or the like. It is understood that the other end of the conduit 10 is connected to the fluid distribution system.

A seal ring 12, of an elastomeric material, fits inside the bead and is sized so that the inner surface of the seal ring 12 projects slightly from the inner surface of the conduit 10. The seal ring 12 functions to seal against the leakage of fluid in a manner that will be described.

The above-mentioned flared end portion of the conduit 10 is adapted for connection to a tubular casting, or fitting, 14. The casting 14 can be of the type that is designed to form a part of the above-mentioned fluid distribution system, and, as such, is fixed at its other end to a container, a housing, a dispenser, or the like (not shown) for distributing fluid thereto. For example, the casting 14 could be affixed to a gasoline pumping unit at a gasoline service station.

The casting 14 has a cylindrical flange 14a extending from one end thereof, and a circumferential groove 14b formed in the latter end immediately adjacent the flange. The outer diameter of the flange 14a is slightly less that the inner diameter of the conduit 10 so as to extend within the conduit 10 in a fairly tight fit to support and align the conduit in a coaxial relationship to the casting. The groove 14b of the casting 14 is dimensioned so as to receive the flared end of the conduit 10 in a manner to be described in detail.

A first pair of aligned openings 14c extend through the end portion of the wall of the casting 14 adjacent the end thereof, and a second pair of aligned, through openings 14d also extend through the wall of the casting in a diametrically opposed relation to the openings 14c. The respective pairs of openings 14c and 14d are coaxial with two imaginary lines (shown by the phantom lines in FIG. 1) that respectively extend through two imaginary chords formed through the casting 14. Two elongated pins 22a and 22b are adapted to extend through the pairs of openings 14c and 14d, respectively, to secure the conduit 10 to the casting 14 in a manner to be described.

To connect the conduit 10 to the casting 14, the seal ring 12 is placed in the bead 10a of the conduit, and the conduit is advanced towards the casting 14 until the flange 14a of the casting extends in the bore of the conduit. The conduit 10 is advanced further until the flared end portion of the conduit enters the groove 14b of the casting 14, and the end of the conduit engages the bottom of the groove to locate the conduit relative to the casting as shown in FIG. 2.

The two pairs pins 22a and 22b are then inserted though the pairs of openings 14c and 14d, respectively, so that a segment of each pin extends through diametrically opposed sections of the groove 14b just radially outwardly from the flared end portion of the conduit 10 that extends in the groove, as shown in FIG. 2. Therefore, the flared end portion of the conduit 10 is captured in the groove 14b and the conduit is thus secured to the casting 14. In this secured position, the seal ring 12 engages a corresponding outer surface portion of the flange 14a to seal against fluid leakage between the flange and the conduit 10.

Several advantages result from the foregoing. For example, inexpensive components can be used, and welded or threaded fasteners are eliminated. Also, there is no leakage and no reduction of the inner cross-section of the conduit.

Figure 3:
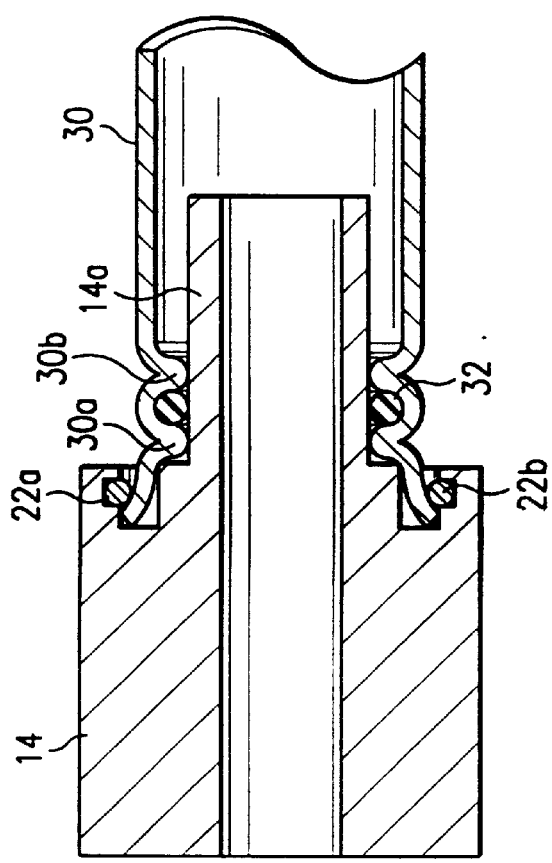
FIGS. 3, 4 and 7 are views, similar to FIG. 2, but depicting alternate embodiments of the assembly of the present invention.

The embodiment of FIG. 3 is similar to that of FIGS. 1 and 2 and identical components are given the same reference numerals. According to the embodiment of FIG. 3, a conduit 30 is provided having two internal beads 30a and 30b that define a space therebetween in which an elastomeric seal ring 32 extends. The conduit 30 and the flange 14a are sized so that an annular space is defined therebetween into which the beads 30a and 30b extend. The inner diameters of the beads 30a and 30b are slightly greater than the outer diameter of the flange 14a so that the flange is surrounded by the beads in a fairly tight fit. As a result, the flange 14a supports the conduit 10 in a coaxial relation to the casting 14. The seal ring 32 is sized so that its inner surface projects radially inwardly from the beads 30a and 30b.

Thus, when the conduit 30 is connected to the casting 14 in the manner described above in connection with the embodiment of FIGS. 1 and 2, the projecting portion of the seal ring 32 engages the corresponding outer surface of the flange 14a of the casting 14 to establish a fluid seal. Otherwise, the embodiment of FIG. 3 is identical to that of the embodiment of FIGS. 1 and 2 and enjoys all of the advantages thereof.

Figure 4:
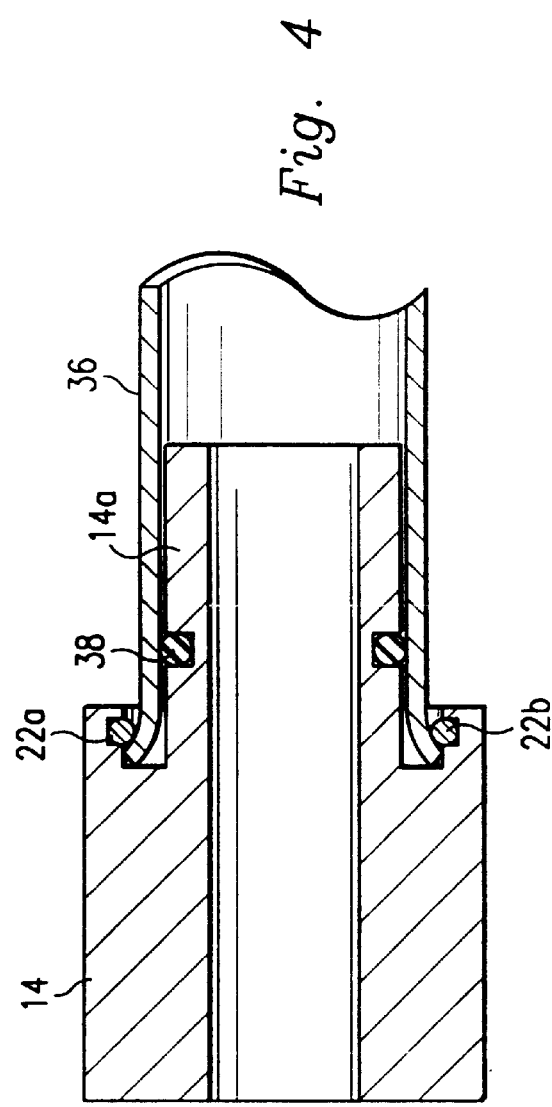

The embodiment of FIG. 4 is similar to the embodiment of FIGS. 1 and 2 and to the embodiment of FIG. 3 and identical components are given the same reference numerals. According to the embodiment of FIG. 4, a conduit 36 is provided which has an internal diameter that is only slightly greater than the outer diameter of the flange 14a of the casting 14, as in the embodiment of FIGS. 1 and 2. A circumferential groove is formed in the outer surface of the flange 14a that receives an elastomeric seal ring 38 that is sized so that its outer surface projects slightly radially outwardly from the groove. Thus, when the conduit 36 is connected to the casting 14 in the manner described above in connection with the embodiment of FIGS. 1 and 2, the projecting portion of the seal ring 38 engages the corresponding inner surface of the conduit 36 to establish a fluid seal. Otherwise, the embodiment of FIG. 4 is identical to that of the embodiment of FIGS. 1–3 and enjoys all of the advantages thereof.

The embodiment of FIGS. 5 and 6 is similar to that of FIGS. 1 and 2 and includes a conduit 40 provided with an external annular bead 40a on one end portion thereof. A seal ring 42, of an elastomeric material, extends in the bead 10a and is sized so that its inner surface projects slightly outwardly from the inner surface of the conduit, as in the embodiment of FIGS. 1 and 2.

A casting 44 has a cylindrical flange 44a extending from the end thereof that extends within the conduit 40 to support and align same in a coaxial relationship to the casting, as in the embodiment of FIGS. 1 and 2. According to this embodiment the end of the conduit 40 butts against the end of the casting 44 as shown in FIG. 6, and a circumferential groove 44b is provided in the outer surface of the casting 14 near the latter end.

The pins 22a and 22b of the embodiment of FIGS. 1 and 2 are replaced by a cylindrical clip 46 for securing the conduit 10 to the casting 14. To this end, the clip 46 is sized so a portion of it extends over the latter end portion of the conduit 40 and the bead 40a while the remaining portion extends over the latter end of the casting 4 as viewed in FIG. 6. The clip 46 is U-shaped in cross-section with one of its legs 46a extending radially inwardly and into the groove 44b of the casing 44, and with its other leg 46b abutting an outer surface of the conduit 10, to secure the conduit to the casting. Thus, the embodiment of FIGS. 5 and 6 enjoys all of the advantages of the previous embodiments while permitting use of a different connector.

Figure 7:
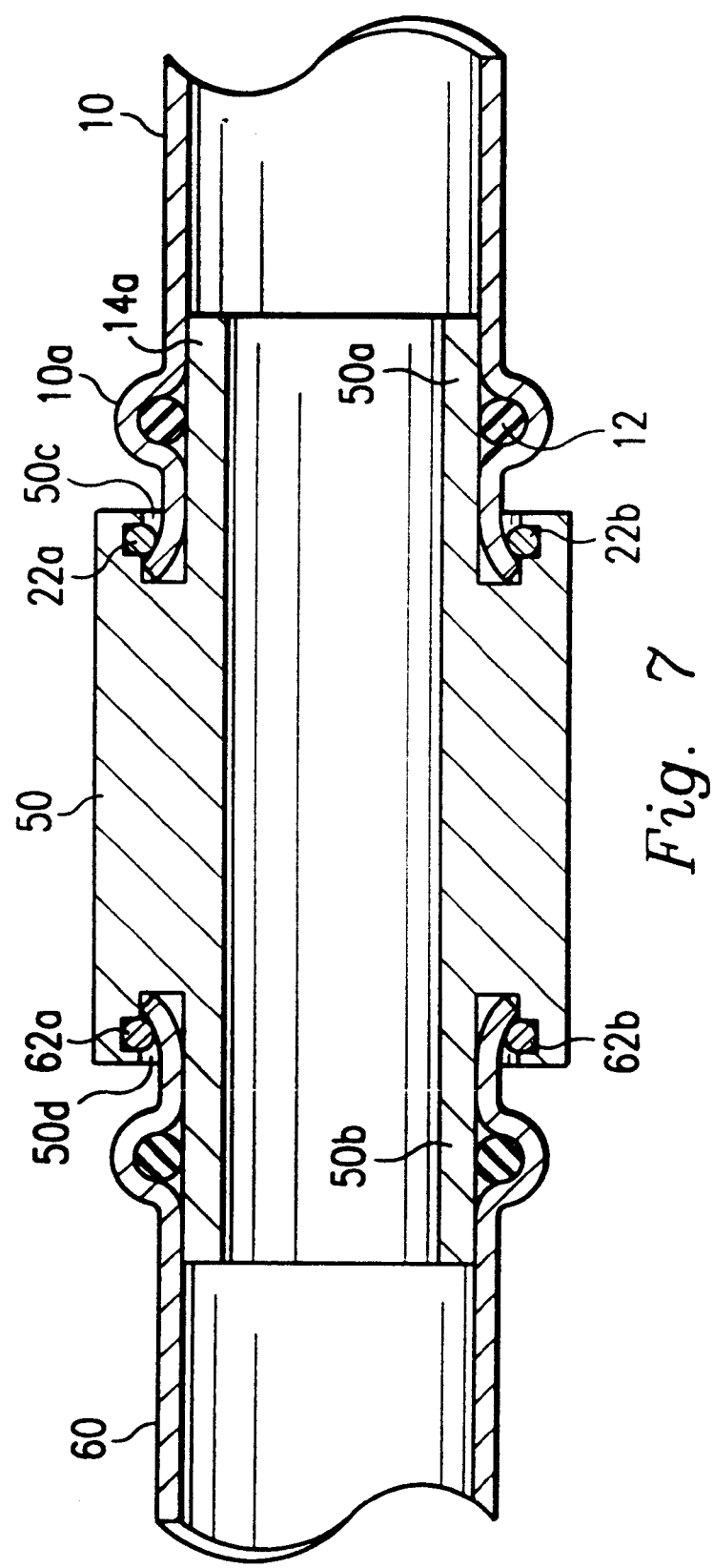

An embodiment for connecting two conduits in fluid communication through a casting is shown in FIG. 7 and incorporates the components of the embodiment of FIGS. 1 and 2 which are given the same reference numerals. According to the embodiment of FIG. 7, a casting 50 is provided which is identical to the casting 14 of the embodiment of FIGS. 1 and 2 with the exception that it is provided with a flange 50a at one end that is identical to the flange 14a of the casting 14, and an additional flange 50b at the other end that is also identical to the flange 14a. Two circumferential grooves 50c and 50d are provided in the respective ends of the casting 50 which are identical to the groove 14b of the casting 14.

An additional conduit 60 is provided that is identical to the conduit 10 and is connected to the casting 50 in the same manner as the conduit 10 is connected to the casting 14 in the embodiment of FIGS. 1 and 2. To this end, the conduit 60 is fitted over the flange 50b of the casting 50 with its flared end extending in the groove 50d. Two pairs of pins 62a and 62b are provided that extend through corresponding openings in the casting 50 to secure the conduit 60 to the casting in the same manner as described in connection with the embodiment of FIGS. 1 and 2.

To assemble the assembly of the embodiment of FIG. 7, the end portion of the conduit 10 of the embodiment of FIGS. 1 and 2 is fitted over the flange 50a and is secured thereto by the pins 22a and 22b as described above. Similarly, the end portion of the conduit 60 is fitted over the flange 50b and is secured thereto by the pins 62a and 62b in the manner discussed in connection with the latter embodiment.

The conduits 10 and 60 and the casting 50 together define a through bore, and the embodiment of FIG. 7 thus enables the conduits 10 and 60 to be connected together through the casting 50 in fluid flow communication and yet enjoys all of the advantages of the previous embodiments outlined above.

It is understood that variations may be made in the foregoing without departing from the scope of the invention. For example, the specific features of each embodiment can be used with the other embodiments. For example, the clip 46 of the embodiment of FIGS. 5 and 6 can be used in the embodiments of FIGS. 1–4 and 7; the seal arrangements of the embodiments of FIGS. 3 and 4 can be used in any of the embodiments of FIGS. 1,2, and 5–7, and any of the embodiment of FIGS. 3–5 can be adapted to connect two conduits together through their respective castings as disclosed in the embodiment of FIG. 7. Also, the two pins 22a and 22b can be replaced with a single U-shaped pin with the legs of the latter pin extending the openings 14c and 14d, respectively. Further, the single bead of the embodiment of FIGS. 1 and 2 can project radially inwardly from the conduit, and the double bead of the embodiment of FIG. 3 can project radially outwardly from the conduit.

It is understood that other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. An assembly comprising a conduit having a flared end portion, a tubular casting having at least one opening extending through a wall thereof, an axially-projecting cylindrical flange projecting from one end of the casting and extending within the end portion of the conduit to support same, an annular groove formed in the end of the casting, the end portion of the conduit extending in the groove, and at least one pin extending through the opening and engaging the flared end portion of the conduit for securing the end portion of the conduit in the groove.

2. The assembly of claim 1 wherein the casting is in the form of a tubular member and wherein the groove is disposed radially outwardly from the flange for receiving the end of the conduit and the pin.

3. The assembly of claim 1 wherein the flange is cylindrical and further comprising a bead formed on the conduit and extending around the flange, and a seal ring disposed in the bead and engaging the flange.

4. The assembly of claim 3 wherein the bead projects radially outwardly from the conduit and wherein the seal ring is located radially inwardly from the bead.

5. The assembly of claim 3 wherein the bead projects radially inwardly from the conduit and wherein the seal ring is located radially inwardly from the bead.

6. The assembly of claim 1 wherein the flange has a annular groove formed therein, and further comprising a seal ring disposed in the groove and projecting therefrom in engagement with the conduit.

7. The assembly of claim 1 where there is a first pair of openings formed through the casting wall and a second pair of openings formed through the latter wall diametrically opposed to the first pair of openings, and wherein there are two pins respectively extending through the first and the second pairs of openings and in engagement with the flared end of the conduit.

8. An assembly comprising two conduits each having a flared end portion, a tubular casting having at least two openings extending through a wall thereof, an axially-projecting cylindrical flange projecting from each end of the casting and within the end portion of a corresponding conduit to support same, an annular groove formed in each end portion of the casting, the end portion of each conduit extending in a corresponding groove, and two pins respectively extending through the openings for securing the end portion of the conduit in the groove.

9. The assembly of claim 8 wherein each casting is in the form of a tubular member and wherein each groove is disposed radially outwardly from the corresponding flange for receiving the end of the corresponding conduit and the corresponding pin.

10. The assembly of claim 8 wherein each flange is cylindrical and further comprising a bead formed on the each end portion of the conduit and a seal ring extending in each bead and engaging the corresponding flange.

11. The assembly of claim 10 wherein each bead projects radially outwardly from the corresponding conduit and wherein each seal ring is located radially inwardly from the corresponding bead.

12. The assembly of claim 8 further comprising a seal ring disposed in the groove and projecting therefrom in engagement with the conduit.

13. The assembly of claim 8 where there is a first pair of openings formed through the casting wall and a second pair of openings formed through the latter wall diametrically opposed to the first pair of openings, and wherein there are two pins respectively extending through the first and the second pairs of openings and in engagement with the flared end of the conduit.

14. The assembly of claim 8 wherein the flanges are cylindrical and further comprising a bead formed on each of the conduits, and a seal ring disposed in each bead and engaging the corresponding flange.

15. The assembly of claim 14 wherein the beads project radially outwardly from the corresponding conduits and wherein the seal rings are located radially inwardly from the corresponding respective beads.

16. The assembly of claim 1 where there is a pair of openings formed through the casting wall and a second pair of opening formed through the latter wall diametrically opposed to the first pair of openings, and wherein there are two pins respectively extending through the first and the second pair of openings and in engagement with the flared end of the conduit.

17. The assembly of claim 8 wherein the flanges are cylindrical and further comprising a bead formed on each of the conduits and a seal ring extending in each bead and engaging the flange.

18. The assembly of claim 17 wherein the beads projects radially outwardly from their respective conduits and wherein the seal rings projects radially inwardly from their respective beads.

* * * * *